Feb. 22, 1955   J. C. ARNOLD   2,702,882
APPARATUS FOR MEASURING THE EARTH'S MAGNETIC FIELD
Filed March 1, 1952
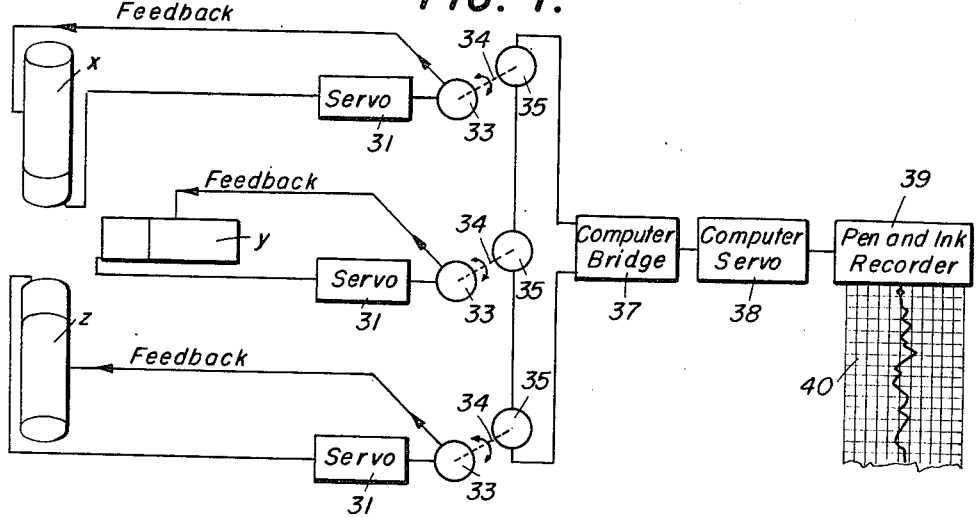
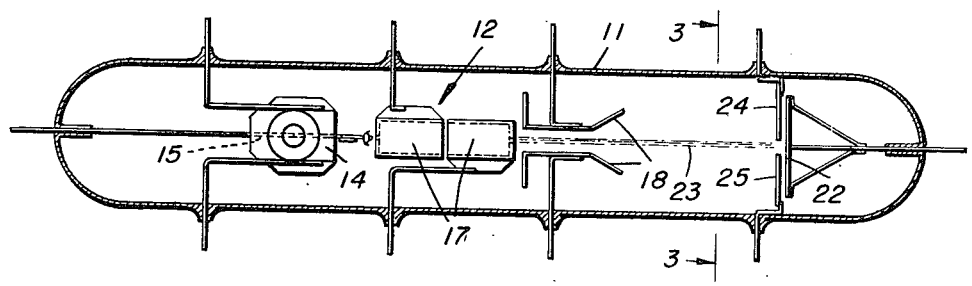
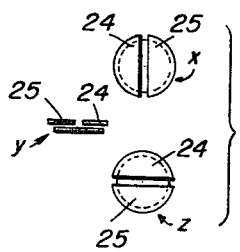
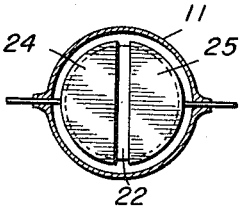
INVENTOR
JAMES C. ARNOLD
BY
ATTORNEYS

United States Patent Office 2,702,882
Patented Feb. 22, 1955

2,702,882

APPARATUS FOR MEASURING THE EARTH'S MAGNETIC FIELD

James C. Arnold, Los Angeles, Calif., assignor to Gamma Surveys, Inc., Los Angeles, Calif., a corporation of California Application March 1, 1952, Serial No. 274,473

4 Claims. (Cl. 324—44)

This invention has to do generally with geophysical exploration by magnetic methods and more particularly with methods of and apparatus for obtaining relatively accurate measurements of the earth's magnetic field in given areas.

In prospecting for oil, using magnetic methods, attempts have been made to take or obtain the magnetic measurements in the air above the earth's surface, as for instance by having the equipment in an airplane which flies over the area to be prospected. Magnetometers of various kinds are used for this purpose, but one difficulty is that with those magnetometers with which I am familiar it is necessary to maintain the magnetometer oriented with respect to the earth during its flight over the area in order to obtain accurate measurements. While gyroscopes are used to attain orientation, such devices are not capable of maintaining the magnetometer sufficiently accurately oriented to obtain good results. Also, such equipment is relatively expensive and quite heavy.

An object of this invention is to provide novel magnetic measuring apparatus in the nature of an electromagnetometer means designed for use in aerial prospecting by magnetic methods which does not have the above-noted disadvantages of conventional magnetometers.

A particular object of the invention is to provide an improved novel electromagnetometer means which can be used for obtaining accurate measurements of the earth's magnetic field irrespective of whether the electromagnetometer means is oriented in a given position with relation to the earth or the earth's magnetic field.

Another object is to provide an electromagnetometer means by which it is possible to obtain more accurate measurements or indications of the earth's magnetic field from positions above the earth's surface than has hitherto been possible.

Another object is to provide a novel improved method of obtaining an indication or measurement of the earth's magnetic field from a point in the air above the earth's surface.

A further object is to provide improved apparatus for use in aerial prospecting wherein magnetic measurements are taken above the earth's surface which is relatively lighter in weight and less expensive than equipment now used for this purpose.

These and other objects will be apparent from the drawing and the following description.

Referring to the drawing:

Fig. 1 is a schematic representation of apparatus embodying the invention;

Fig. 2 is an elevational view of a vacuum tube used in the apparatus of Fig. 1 with the envelope thereof shown in section;

Fig. 3 is a section on line 3—3 of Fig. 2; and

Fig. 4 is a view showing the relative disposition of the targets of three tubes oriented in a preferred manner.

More particularly describing the invention, I will refer to the apparatus shown in Fig. 1 as an electromagnetometer means. This apparatus is designed for use in geophysical work wherein measurements are made of the strength of the earth's magnetic field at various points or along selected lines over a given area. Preferably the apparatus is flown by helicopter over the area at low altitude, as at from 25 to 100 feet elevation above the surface, since the earth's field decreases with altitude in accordance with the law of inverse squares. In the apparatus I employ a group of detectors which are directionally sensitive to the earth's magnetic field, including changes of strength therein. These detectors serve to convert magnetic changes in the earth's magnetic field into electrical impulses which are coordinated and used to operate a suitable recorder.

In the search for petroleum I use sensitivities of from 5-25 gamma (gamma=$1\times10^{-5}$ gauss) and ranges on my present recorder to the order of 800 gamma, however, by some simple changes in the bridging circuits and computing circuit it is possible to accommodate any increases to be expected while in the search for more highly magnetic rocks and ore bodies.

In general, I employ three (or a multiple of three) directionally sensitive, magnetic field-strength detectors oriented to each other in a given way. The output from these detectors (vacuum tubes embodying an electron gun, a plate to which the beam is normally drawn, and a pair of laterally positioned targets) is squared and then combined to measure or give a sensible indication of the total earth's magnetic field strength. The electromagnetometer thus comprises four channels. Three channels are used to measure the magnetic field strength along mutually perpendicular axes and the fourth is used to combine the results of the other three so that its output is equal to the total field intensity regardless of the orientation of the detector assembly in space. The computations are made according to the following relation: $H_t = (H_x^2 + H_y^2 + H_z^2)^{1/2}$ in which $H$=magnetic field, $t$=total, and $x, y, z$ are detector channels.

The basic detector device is a vacuum tube containing no magnetic parts within which an electron beam is accelerated from a gun assembly at the base end to a target assembly at the other end. The electron beam is deflected by the incident magnetic field and this deflection is detected by the target assembly, but only as to direction, not amount.

Referring now to Figs. 2 and 3 for a description of such a detector, 11 indicates the envelope which may be glass or other suitable material. This is evacuated. In the portion of the tube at the left of Fig. 2 is an electron gun 12 which includes conventional elements, namely cathode 14, filament 15, accelerator grid (not shown), accelerator electrodes 17, and deflector plates 18. At the other end of the tube is the target assembly which includes the central plate 22 to which the beam 23 is drawn normally and the two target plates 24 and 25. The plates are adjacently disposed in parallel relation with the target plates spaced laterally or edgewise of each other equidistant from the center axis. The target plates are preferably semi-circular in shape as shown. To simplify the drawing, the leads have been brought out through the side wall of the envelope.

Assuming the tube is placed in operation by energizing the electron gun in a conventional manner, in the absence of any incident magnetic field the beam will remain between the target plates 24 and 25 impinging on the center plate. An incident magnetic field will tend to move the electron stream or beam onto one or the other target plate according to the polarity of the magnetism. However, due to the fact that the target plates 24 and 25 define a straight slot or aperture therebetween, it will be apparent that the tube is sensitive to magnetic influence primarily when said influence, as represented by lines of force, is from a direction or in a plane parallel to the longitudinal axis of the slot thereby causing the beam to be deflected to the appropriate target plate and making the circuit thereto conductive.

I prefer to use three such tubes (although a multiple of three can be used) and mount them physically to so orient them that the tubes are primarily sensitive in planes which are mutually normal to each other, that is, each sensitivity direction or plane is at 90° or perpendicular to each of the others. One way to accomplish this is to so mount the tubes that their targets are oriented as shown in Fig. 4. With this arrangement, it will be noted that, together, the tubes are effective to detect a magnetic field from any direction whereby it is possible to compute the sum or total of the detected fields.

Referring now to Fig. 1, the three tubes are here additionally designated $x$, $y$ and $z$, respectively. Each tube is connected to what I will term a servo mechanism, indicated by 31, composed of a converter, an amplifier, a transformer, a phase-discriminating circuit, and a two-phase servo-motor, all of which are conventional in the art. The servo-motor actuates a multi-turn, helical, balancing potentiometer 33. The latter acts as a voltage divider, feeding back sufficient voltage to the appropriate deflection plate 18 in the tube to restore the beam in the tube to central or neutral position after the beam has been deflected to one of the target plates by incident magnetism.

The relation between the feedback potential and the incident magnetic field is linear; the feedback potentiometer is also linear; therefore, the shaft rotation of the feedback potentiometer is a linear measure of the magnetic field. This shaft rotation is applied by a mechanical connection 34 to an output potentiometer 35 of the same type as the balancing potentiometer 33. This potentiometer is loaded with a fixed resistance to give a parabolic rotation vs. resistance characteristic, thereby squaring the signal as well as converting it into a form convenient for transmission to the computer bridge 37. This output resistance is then equal to the $H^2$ term (with the appropriate subscript) in the equation above. The outputs from the three measuring channels are added together so that their total resistance is then equal to $H_x^2 + H_y^2 + H_z^2$. By equating this resistance to another resistance in the computer bridge circuit 37, this last resistance is then equal to $H_t^2$ (total magnetic field), when this bridge is balanced by the computer servo mechanism 38, composed of a converter, amplifier, transformer, phase-discriminator and two-phase motor. This motor serves to balance the bridge, above mentioned, and also drives the recorder pen of recorder 39 by means of mechanical connections. The pen gives a sensible indication on the strip chart 40 which may be translated into magnetic-geological information by those skilled in the art.

I claim:

1. In means for measuring variations in the strength of the total earth's magnetic field at a given point, a plurality of directionally sensitive electronic detectors of magnetic field strength so oriented that they are primarily sensitive in planes which are mutually perpendicular, feedback means for each detector including a balancing potentiometer, an output potentiometer mechanically connected to each balancing potentiometer and loaded with a fixed resistance whereby to square the signal received by it, means for combining the squared outputs of the output potentiometers, recording means, and means utilizing the combined output to drive said recording means.

2. Means as defined in claim 1 in which said detectors each includes a vacuum tube having an electron gun and having a target assembly capable of giving an electrical indication of the deflection of the electron beam caused by an incident magnetic field.

3. Means as defined in claim 1 in which three detectors are employed and each includes a vacuum tube having an electron gun and having a target assembly capable of giving an electrical indication of the deflection of the electron beam caused by an incident magnetic field.

4. In means for measuring variations in the strength of the total earth's magnetic field at a given point, three electron beam tubes including beam deflection plates each having a target assembly disposed in current carrying relation to the electron source, the target assembly including a pair of target plates normally out of current carrying relation to the electron source and so positioned as to become in current carrying relation to the electron source upon deflection of the electron beam under the influence of incident magnetic force, balancing circuits for each tube, said circuits being divided into two parts, one part for feeding portions of the current received from one of said target plates to one of said deflection plates, means for squaring the other part of the output, a recorder, and means for combining the squared outputs and utilizing the combined squared output to drive the recorder.

References Cited in the file of this patent

UNITED STATES PATENTS

| Number | Name | Date |
|---|---|---|
| 2,027,393 | McCreary | Jan. 14, 1936 |
| 2,256,301 | Wagner | Sept. 16, 1941 |
| 2,358,901 | Ziebolz | Sept. 26, 1944 |
| 2,421,583 | Stuart | June 3, 1947 |
| 2,427,666 | Felch et al. | Sept. 23, 1947 |
| 2,437,374 | Burroughs | Mar. 9, 1948 |
| 2,438,964 | Cunningham et al. | Apr. 6, 1948 |
| 2,594,517 | Sziklai | Apr. 29, 1952 |